United States Patent
You et al.

(10) Patent No.: US 12,210,469 B2
(45) Date of Patent: Jan. 28, 2025

(54) METHOD FOR ORDER-PRESERVING EXECUTION OF WRITE REQUEST AND NETWORK DEVICE

(71) Applicant: HUAWEI TECHNOLOGIES CO., LTD., Guangdong (CN)

(72) Inventors: Jun You, Chengdu (CN); Bowei Yu, Chengdu (CN); Yanhui Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/315,669

(22) Filed: May 11, 2023

(65) Prior Publication Data

US 2023/0281141 A1    Sep. 7, 2023

Related U.S. Application Data

(63) Continuation of application No. PCT/CN2021/104556, filed on Jul. 5, 2021.

(30) Foreign Application Priority Data

Nov. 13, 2020 (CN) .......................... 202011271692.5

(51) Int. Cl.
G06F 13/00 (2006.01)
G06F 13/28 (2006.01)
G06F 3/06 (2006.01)
H04L 1/00 (2006.01)
H04L 1/1607 (2023.01)

(52) U.S. Cl.
CPC ............ G06F 13/28 (2013.01); *G06F 3/0608* (2013.01); *H04L 1/0018* (2013.01); *H04L 1/1607* (2013.01)

(58) Field of Classification Search
CPC ...... G06F 13/28; G06F 3/0608; G06F 3/0613; G06F 3/0659; G06F 3/067; G06F 12/023; G06F 13/00; H04L 1/0018; H04L 1/1607
See application file for complete search history.

(56) References Cited

U.S. PATENT DOCUMENTS

| | | | |
|---|---|---|---|
| 2010/0262740 A1* | 10/2010 | Borchers | G06F 12/0246 710/263 |
| 2014/0059270 A1* | 2/2014 | Zaltsman | G06F 3/0623 711/E12.008 |
| 2017/0160929 A1* | 6/2017 | Ayandeh | G06F 3/061 |
| 2022/0244861 A1* | 8/2022 | Li | G06F 3/061 |
| 2023/0152978 A1* | 5/2023 | He | G06F 12/0246 711/103 |

OTHER PUBLICATIONS

Extended European Search Report in European Appln No. 21890647.7, dated Feb. 23, 2024, 11 pages.

* cited by examiner

*Primary Examiner* — Tammara R Peyton
(74) *Attorney, Agent, or Firm* — Fish & Richardson P.C.

(57) ABSTRACT

Example methods and network devices for order-preserving execution of a write request are disclosed. One example method is performed by a network device of a storage node. The example method includes receiving an order-preserving confirmation request, where the order-preserving confirmation request carries a first write address assigned for a first write request. It is confirmed that execution of a second write request for which a second write address has been assigned is not completed, where the second write address precedes the first write address. Sending feedback information for the order-preserving confirmation request is delayed.

15 Claims, 9 Drawing Sheets

METHOD FOR ORDER-PRESERVING
EXECUTION OF WRITE REQUEST AND
NETWORK DEVICE

CROSS-REFERENCE TO RELATED
APPLICATIONS

This application is a continuation of International Application No. PCT/CN2021/104556, filed on Jul. 5, 2021, which claims priority to Chinese Patent Application No. 202011271692.5, filed on Nov. 13, 2020. The disclosures of the aforementioned applications are hereby incorporated by reference in their entireties.

TECHNICAL FIELD

This application relates to the field of computer technologies, and specifically, to a method for order-preserving execution of a write request and a network device.

BACKGROUND

A storage system generally includes a plurality of computing nodes and a plurality of storage nodes. The plurality of computing nodes may concurrently perform a write operation in storage space of the storage nodes by using a remote direct memory access (RDMA) technology. After receiving, from an upper-layer application (APP), a write request for writing data into storage space of a storage node, a computing node generally first applies to the storage node for a write address for writing the data, and then the computing node requests the storage node to write the corresponding data into the write address. In the storage system, to ensure that there is no scattered unused space between space in which data has been written in the storage space of the storage node, after requesting the storage node to write the data, the computing node sends an order-preserving confirmation request to the storage node by using the RDMA technology, to confirm whether the write operation is an order-preserving write operation. If a confirmation result is that the write operation is an order-preserving write operation, the computing node returns, to the upper-layer application of the computing node, information indicating that execution of the write request is completed. If the confirmation result is that the write operation is not an order-preserving write operation, the computing node repeatedly sends an order-preserving confirmation request to the storage node, to return, to the upper-layer application after confirming that the write operation is an order-preserving write operation, the information indicating that the execution of the write request is completed. Consequently, RDMA communication bandwidth is occupied.

SUMMARY

Embodiments of this application aim to provide a more effective solution for order-preserving execution of a write request. In this solution, through operations performed by a network device in a storage node, when confirmation of an order-preserving confirmation request fails, sending feedback information to a computing node is delayed, to reduce occupation of RDMA communication bandwidth and improve communication efficiency of a storage system.

To achieve the foregoing objective, an aspect of this application provides a method for order-preserving execution of a write request. The method is performed by a network device of a storage node, and includes: receiving an order-preserving confirmation request, where the order-preserving confirmation request carries a first write address assigned for a first write request; confirming that execution of a second write request for which a second write address has been assigned is not completed, where the second write address precedes the first write address; and delaying sending feedback information for the order-preserving confirmation request. That the second write address precedes the first write address indicates that the second write address is smaller than the first write address. Therefore, when a write request is executed, the second write request needs to be completed first. In other words, a write operation performed in the second write address is fed back to an upper-layer application first, and then, the first write request is completed. In other words, a write operation performed in the first write address is fed back to the upper-layer application. When confirmation of the order-preserving confirmation request fails, the network device (for example, a network interface card) delays returning return information for the order-preserving confirmation request, so that the computing node is prevented from repeatedly sending an order-preserving confirmation request to the network interface card a plurality of times for order-preserving confirmation, to reduce occupation of the RDMA communication bandwidth.

In an implementation, the delaying sending feedback information for the order-preserving confirmation request includes: sending a delay processing request corresponding to the first write request to a processor of the storage node, receiving, from the processor after first duration timed by the processor, delay processing end information corresponding to the first write request, and sending the feedback information for the order-preserving confirmation request in response to the delay processing end information. In an implementation, the first duration is preset duration. In another implementation, the first duration is determined by the processor based on at least one of: an upper-layer service load; and a difference between the first write address and a write address assigned for the write request of which execution is to be completed currently.

A delay processing request is sent to the processor of the storage node, to enable the processor to time delay processing, so that the processor may execute complex logic of timing, to implement the delay processing. In addition, the processor may further determine the first duration based on complex calculation logic, to implement the delay processing more intelligently.

In an implementation, the delaying sending feedback information for the order-preserving confirmation request includes: determining first duration, timing the first duration, and sending the feedback information for the order-preserving confirmation request after the first duration elapses. In an implementation, the first duration is preset duration. In another implementation, the determining first duration includes: determining the first duration based on at least one of: an upper-layer service load; and a difference between the first write address and a write address assigned for the write request of which execution is to be completed currently.

The network device itself determines the first duration and times the first duration, so that a CPU of the storage node does not need to participate in processing, thereby saving computing resources of the storage node.

In an implementation, the method further includes: after the confirming that execution of a second write request for which a second write address has been assigned is not completed, determining whether a predetermined condition for delaying sending the feedback information is satisfied. The delaying sending the feedback information for the order-preserving confirmation request includes: delaying sending the feedback information for the order-preserving confirmation request when it is determined that the predetermined condition is satisfied. The predetermined condition is at least one of the following conditions: an upper-layer service load is greater than a predetermined threshold; and a difference between the first write address and a write address assigned for a write request of which execution is to be completed currently is greater than a predetermined value.

In an implementation, logical storage space corresponding to a segment of physical storage space in the storage node is set in the storage node, and before the receiving an order-preserving confirmation request, the method further includes: assigning, in the logical storage space, the second write address for the second write request, and assigning, in the logical storage space, the first write address for the first write request.

Logical storage space corresponding to physical storage space in the storage node is set in the storage node, so that the network device of the storage node may map an operation on the logical storage space to an operation on the physical storage space in the storage node, to implement an operation on service data stored in the physical storage space in the storage node.

In an implementation, the confirming that execution of a second write request for which a second storage location has been assigned is not completed includes: determining whether the first write address is a minimum write address in recorded write addresses included in an uncompleted write request accessing the logical storage space, and determining, the first write address is not the minimum write address in the recorded write address included in the uncompleted write request accessing the logical storage space, that the execution of the second write request is not completed.

Whether the first write request is an order-preserving write operation is determined by determining whether the first write address in the first write request matches recorded address information of an uncompleted write request accessing the logical storage space, so that an order of returning completion information of a write request may be more conveniently and accurately controlled.

Another aspect of this application provides an apparatus for order-preserving execution of a write request, deployed for execution in a network device of a storage node. The apparatus includes: a receiving unit, configured to receive an order-preserving confirmation request, where the order-preserving confirmation request carries a first write address assigned for a first write request; a confirmation unit, configured to confirm that execution of a second write request for which a second write address has been assigned is not completed, where the second write address precedes the first write address; and a sending delaying unit, configured to delay sending feedback information for the order-preserving confirmation request.

In an implementation, the sending delaying unit includes: a first sending subunit, configured to send a delay processing request corresponding to the first write request to a processor of the storage node; a receiving subunit, configured to receive, from the processor after first duration timed by the processor, delay processing end information corresponding to the first write request; and a second sending subunit, configured to send the feedback information for the order-preserving confirmation request in response to the delay processing end information.

In an implementation, the sending delaying unit includes: a determining subunit, configured to determine first duration; a timing subunit, configured to time the first duration; and a third sending subunit, configured to send the feedback information for the order-preserving confirmation request after the first duration elapses.

In an implementation, the apparatus further includes: a determining unit, configured to determine, after it is confirmed that execution of the second write request for which the second write address has been assigned is not completed, whether a predetermined condition for delaying sending the feedback information is satisfied. The sending delaying unit is further configured to delay sending the feedback information for the order-preserving confirmation request when it is determined that the predetermined condition is satisfied.

In an implementation, logical storage space corresponding to a segment of physical storage space in the storage node is set in the storage node. The apparatus further includes: a first assignment unit, configured to assign, in the logical storage space, the second write address for the second write request before the order-preserving confirmation request is received; and a second assignment unit, configured to assign, in the logical storage space, the first write address for the first write request.

In an implementation, the confirmation unit is configured to: determine whether a start address of the first write address is consistent with a start address of a write address corresponding to all current uncompleted write requests for the logical storage space, determine, if the start address of the first write address is inconsistent with the start address of the write address corresponding to all the current uncompleted write requests for the logical storage space, that execution of the second write request is not completed.

Another aspect of this application provides a network device, including a processing unit and a storage unit. The storage unit stores executable code. When the processing unit executes the executable code, any one of the foregoing methods is implemented.

Another aspect of this application provides a network device, including: a communication interface, configured to perform data transmission with a storage node and a computing node; and a processing unit, configured to process data received by the communication interface, to perform any one of the foregoing methods.

Another aspect of this application provides a computing device, including any one of the foregoing network devices.

Another aspect of this application provides a storage medium. The storage medium stores executable instructions, and a network device of a storage node executes the executable instructions in the storage medium to implement any one of the foregoing methods.

Another aspect of this application provides a program product. A network device of a storage node runs the program product, to perform any one of the foregoing methods.

BRIEF DESCRIPTION OF DRAWINGS

Embodiments of this application are described with reference to accompanying drawings, so that embodiments of this application can be clearer.

DESCRIPTION OF EMBODIMENTS

The following describes technical solutions of embodiments in this application with reference to accompanying drawings.

Figure 1:
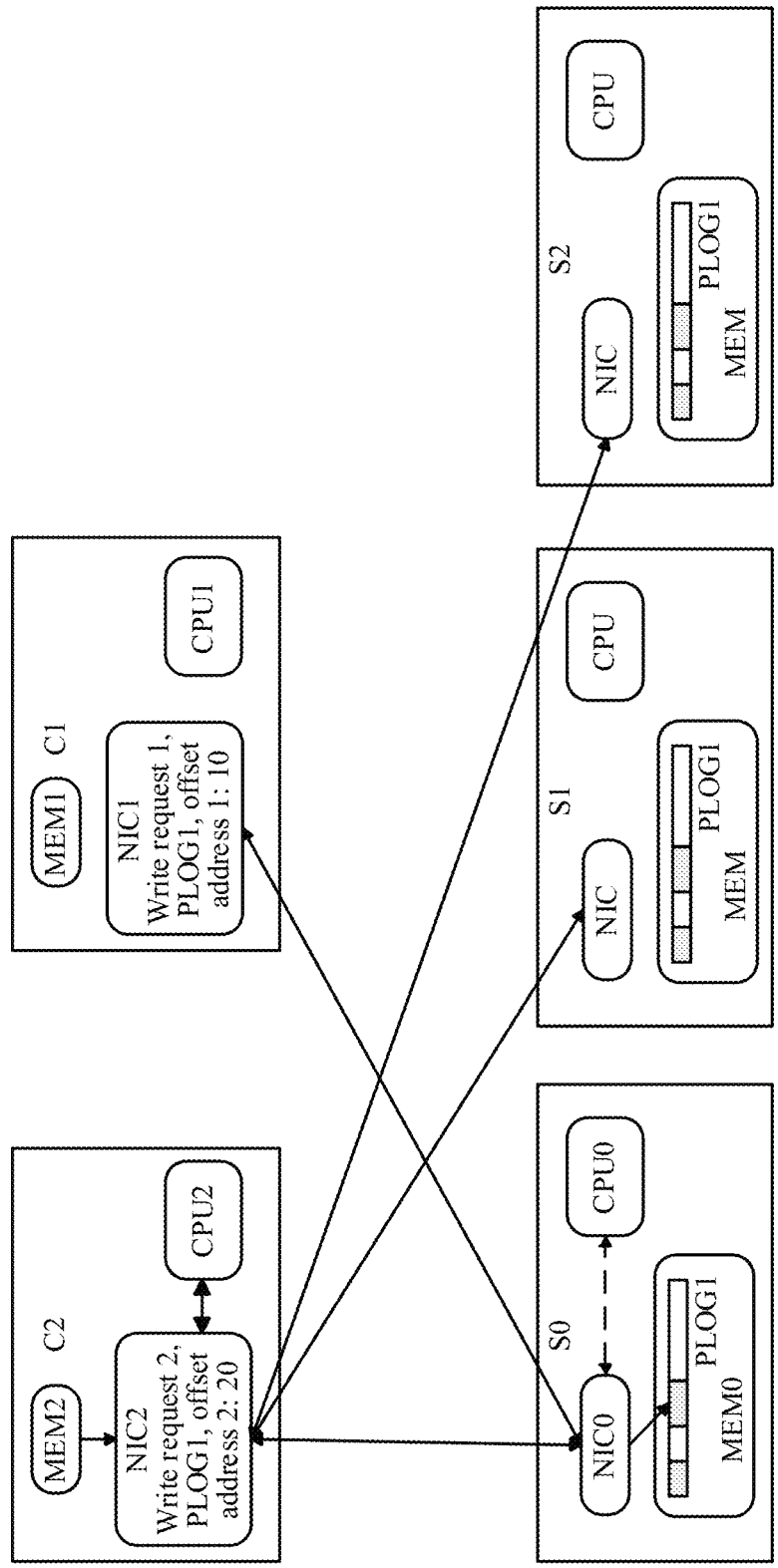
FIG. 1 is a schematic diagram of a storage system according to an embodiment of this application.

FIG. 1 is a schematic diagram of a storage system according to an embodiment of this application. As shown in FIG. 1, the storage system includes a plurality of computing nodes, where the figure illustratively shows a computing node C2 and a computing node C1, and a plurality of storage nodes, where FIG. 1 illustratively shows storage nodes S0, S1, and S2. Each computing node is connected to the storage nodes. FIG. 1 illustratively shows connections between the computing node C2 and the storage nodes S0, S1, and S2. The computing nodes and the storage nodes may be physical servers or physical computing devices, or may be virtual entities, such as virtual machines or containers, abstracted based on universal hardware resources. The computing nodes and the storage nodes each include a memory (MEM), a central processing unit (CPU), and a network interface controller (NIC). The MEM includes, for example, a storage device such as a storage class memory (SCM) and a solid state disk or solid state drive (SSD). Software and hardware architectures for implementing an RDMA technology, such as an Infiniband architecture, an RoCE architecture, and an iWARP architecture, are arranged in the computing nodes and the storage nodes.

Data may be transmitted between the computing nodes and the storage nodes by using the RDMA technology. As shown in FIG. 1, compared with a network transmission technology based on the Transmission Control Protocol/Internet Protocol (TCP/IP protocol), in the RDMA technology, memory data (in other words, data in an application cache) can be directly transmitted between, for example, a client C2 and the storage node S0 through NICs of the client C2 and the storage node S0 without using an operating system (OS) and a TCP/IP protocol stack. In addition, most data transmission load is offloaded to the network interface controllers for execution, so that the CPU is freed up.

Figure 2:
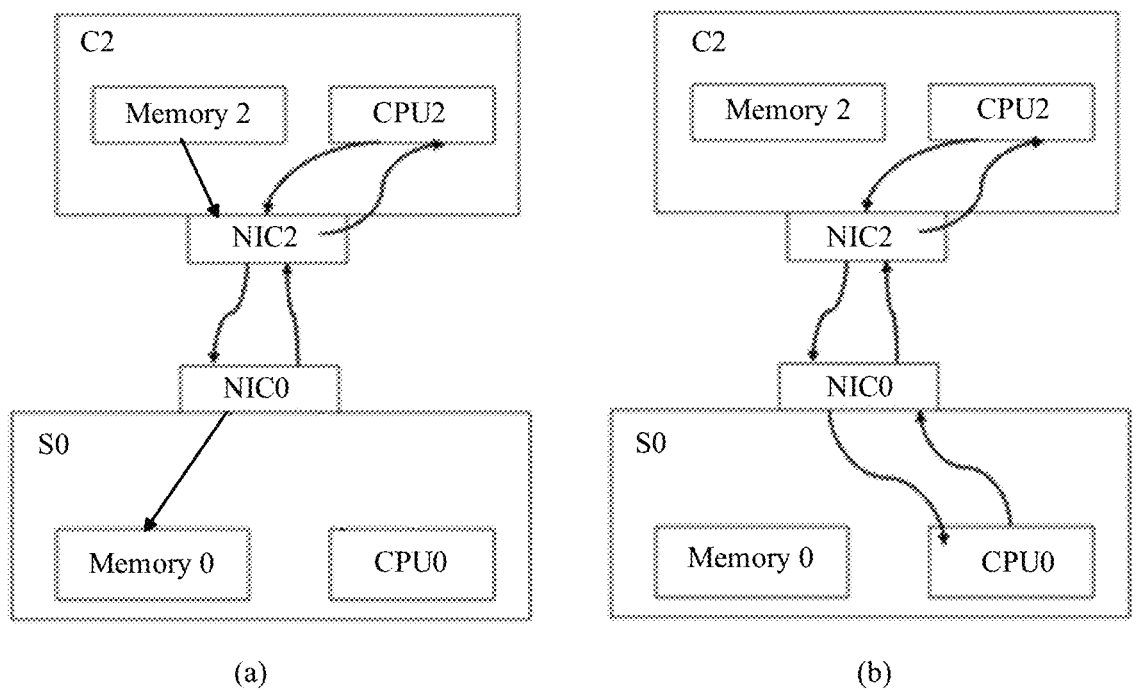
FIG. 2 is a schematic diagram of a unilateral operation (a) and a bilateral operation (b)

The RDMA data transmission technology is divided into a unilateral operation and a bilateral operation depending on whether a destination end of data transmission requires the CPU to participate in the logic of data control. FIG. 2 is a schematic diagram of a unilateral operation (a) and a bilateral operation (b). As shown in (a) in FIG. 2, in the unilateral operation, for example, in a unilateral write operation, a CPU2 in a computing node C2 indicates a NIC2 to send data in an application cache in a memory 2 to a NIC0 of the storage node S0, and the NIC0 of the storage node S0 directly stores the data in a corresponding memory location in a memory 0, to complete the unilateral write operation. In this process, the computing node C2 does not need to use an operating system OS and a TCP/IP protocol stack, and the storage node S0 does not need participation of an operating system OS and a CPU. As shown in (b) in FIG. 2, in the bilateral operation, the CPU2 in the computing node C2 indicates the NIC2 to send, for example, control information (for example, remote procedure call (RPC) information) to the NIC0 of the storage node S0. After receiving the control information, the NIC0 of the storage node S0 transfers the control information to a CPU0 by calling an upper-layer callback function, to enable the CPU0 to perform a corresponding control operation and return an operation result to the computing node C2 through a reverse process of the foregoing process. In the bilateral operation process, use of the operating system OS and the TCP/IP protocol stack is not required. Therefore, both the unilateral operation and the bilateral operation in the foregoing RDMA technology reduce overheads of external memory replication and context switching, reduce CPU processing, and improve system performance.

As shown in FIG. 1, the computing nodes may write data into the storage nodes by using the RDMA technology. For example, both the computing node C2 and the computing node C1 may request to write data into an MEM0 of the storage node S0. In this case, to avoid a hole (in other words, scattered unused space between two segments of used space in the storage space) in the storage space of the computing node S0, a write address may be pre-assigned in a segment of continuous storage space based on a size of data requested write. For example, as shown in FIG. 1, the computing node C1 applies to the storage node S0 in advance, so that the storage node S0 assigns, for a write request 1, a write address "PLOG1, offset address: 10" corresponding to a storage address of the storage node S0. Similarly, a write address "PLOG1, offset address: 20" corresponding to the storage address of the storage node S0 is assigned for a write request 2 of the computing node C2.

A persistence log (PLOG) is a logical storage unit that is arranged in the storage system and that corresponds to a segment of physical address space in a storage medium, and has a predetermined size, for example, 2 MB. To be specific, the PLOG of a size of 2 MB corresponds to continuous storage space of 2 MB. Generally, the PLOG corresponds to physical address space in a medium such as an SCM or an SSD. It may be understood that this is not limited in embodiments of this application, and the PLOG may also correspond to physical address space in another storage medium. An upper-layer application of the computing node C2 may first apply to any storage node (for example, the storage node S0) for an available PLOG1, and then may request to perform a read or write operation on the PLOG1. The storage node S0 may create a new PLOG1 in response to the foregoing application for the PLOG1. To be specific, the storage node S0 assigns actual physical space to the PLOG1 in the memory, records a start address of the physical space corresponding to the newly created PLOG1 in the NIC0, and provides the PLOG1 for the computing node C2 to use. Alternatively, the storage node S0 may provide an existing available PLOG1 for the computing node C2 to use.

In a storage system, to ensure data storage reliability, user data is usually stored by using a multi-copy mechanism. For example, three copies are set to be stored for any data. Therefore, as shown in FIG. 1, when the upper-layer application of the computing node C2 applies for the PLOG1, physical space corresponding to the PLOG1 is provided in, for example, all of the three storage nodes S0, S1, and S2 in the storage system, for the computing node C2 to use. A start address of physical space corresponding to the PLOG1 in each storage node is recorded in an MC of the storage node.

When the upper-layer application of the computing node C2 is intended to write data 2 to the PLOG1 in the storage system, the upper-layer application initiates a request (a write request 2) for writing the data 2 to the PLOG1. The write request 2 includes, for example, an identifier (for example, "PLOG1") of the logical storage unit, a data length (for example, 15 bytes), and a local cache address of the data. Therefore, the computing node C2 first requests the storage node S0 to assign an address that is in the PLOG1 and that may be for writing the data 2. For example, a start address of an address 2 that is in the PLOG1 and that can be currently assigned for the write request 2 is an offset address 2 (for example, 20). Therefore, the write dress assigned by the storage node S0 for the write request 2 is address space that is in the PLOG1, whose start address is 20, and whose length is a length of to-be-written data of the write request 2. After the assignment, the storage node S0 changes a start address of currently unassigned address space in the PLOG1 to 20+15=35. Then, the computing node C2 sends a request for writing the data 2 into the PLOG1 to the storage nodes S0, S1, and S2 separately, to separately write the data 2 into storage space that is in the storage nodes S0, S1, and S2 and that corresponds to the address 2 in the PLOG1.

After writing the foregoing data, the computing node C2 sends an order-preserving confirmation request to the storage node S0 to confirm whether the write operation is an order-preserving write operation. Specifically, the computing node C2 confirms whether the write request 2 is a write request with a minimum write address in all current uncompleted write requests, to be specific, confirms whether a start address of address space of a PLOG1 corresponding to all the current uncompleted write requests is 20. If a confirmation result is that the start address of the address space of the PLOG1 corresponding to all the current uncompleted write requests is 20, the NIC0 of the storage node S0 changes the start address of the address space of the PLOG1 corresponding to all the current uncompleted write requests to 35, and returns, to the NIC2 of the computing node C2, information indicating that execution of the write request 2 is completed, so that the NIC2 of the computing node C2 returns, to the upper-layer application, feedback information indicating that the write operation succeeds. If the confirmation result is that the start address of the address space of the PLOG1 corresponding to all the current uncompleted write requests is not 20, it indicates that execution of a write request for which an address less than 20 is assigned is not completed. For example, relative to the write request 1, the start address of the address space of the PLOG1 obtained by the computing node C1 by applying to the storage node S0 is an offset address of 10, and a length of the to-be-written data is 10. If the computing node C1 has not completed the write request 1 when the computing node C2 initiates the order-preserving confirmation request, the start address of the address space of the PLOG1 corresponding to all the current uncompleted write requests recorded in the storage node S0 is 10.

In this case, in a related technology, the NIC0 of the storage node S0 immediately returns order-preserving confirmation failure information to the NIC2 of the computing node C2. The computing node C2 repeatedly sends the order-preserving confirmation request to the storage node S0 to confirm whether the write operation is an order-preserving write operation, and returns, to the upper-layer application only after determining that the write operation is an order-preserving write operation, information indicating that execution of the write request 2 is completed, to prevent the write request 2 from being completed before the write request 1 is completed, thereby avoiding a hole in storage space that corresponds to the PLOG1 and that is on a storage node. In this implementation, the order-preserving confirmation process is performed through the NIC0 in the storage node S0 without using the CPU0 in the storage node S0. In other words, the order-preserving confirmation process is an RDMA unilateral operation. However, the foregoing repeated order-preserving confirmation process increases a quantity of times of RDMA communication. If a quantity of concurrent write requests is large, a plurality of times of RDMA communication occupy a large amount of RDMA communication bandwidth, which adversely affects the efficiency of RDMA communication.

In a write order-preserving solution according to embodiments of this specification, as shown in FIG. 1, after confirming that a write operation corresponding to the write request 2 is not an order-preserving write operation currently, instead of immediately returning confirmation failure information, the NIC0 of the storage node S0 delays sending the confirmation failure information, to reduce occupation of the RDMA bandwidth.

The following describes in detail the foregoing write order-preserving solution.

Figure 3A:
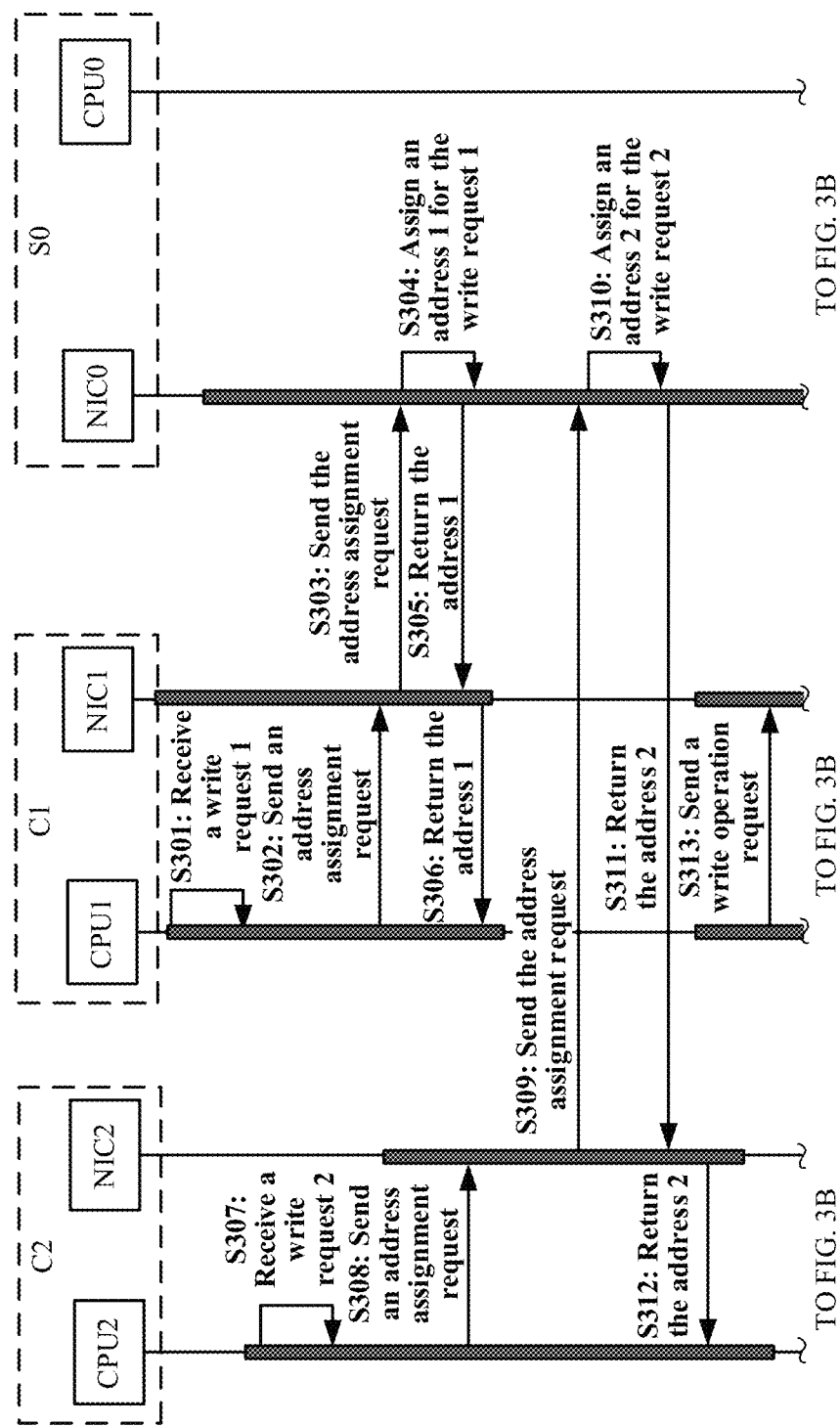
FIG. 3A, FIG. 3B, and FIG. 3C are a flowchart of a method for order-preserving execution of a write request according to an embodiment of this application.
Figure 3B:
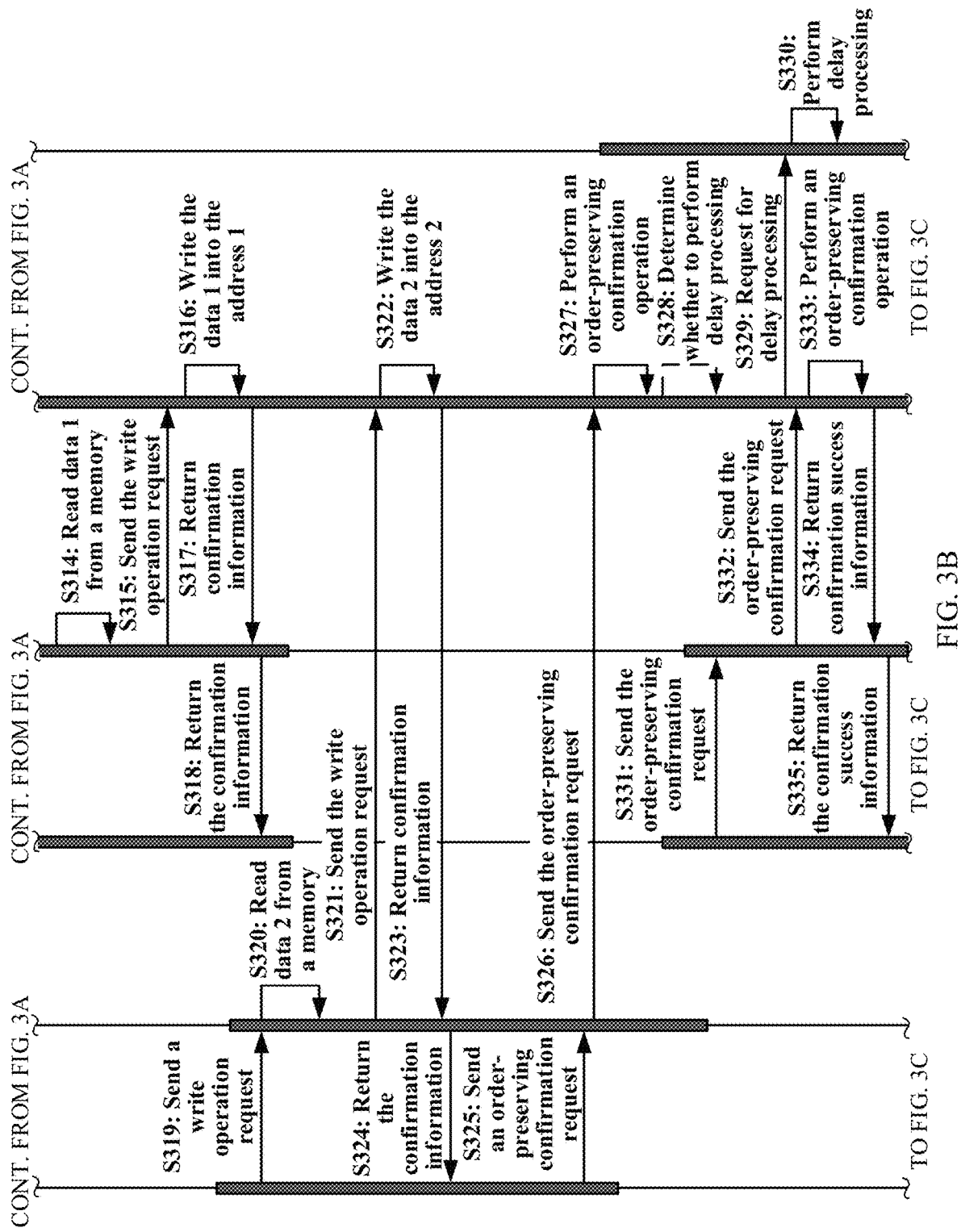
Figure 3C:
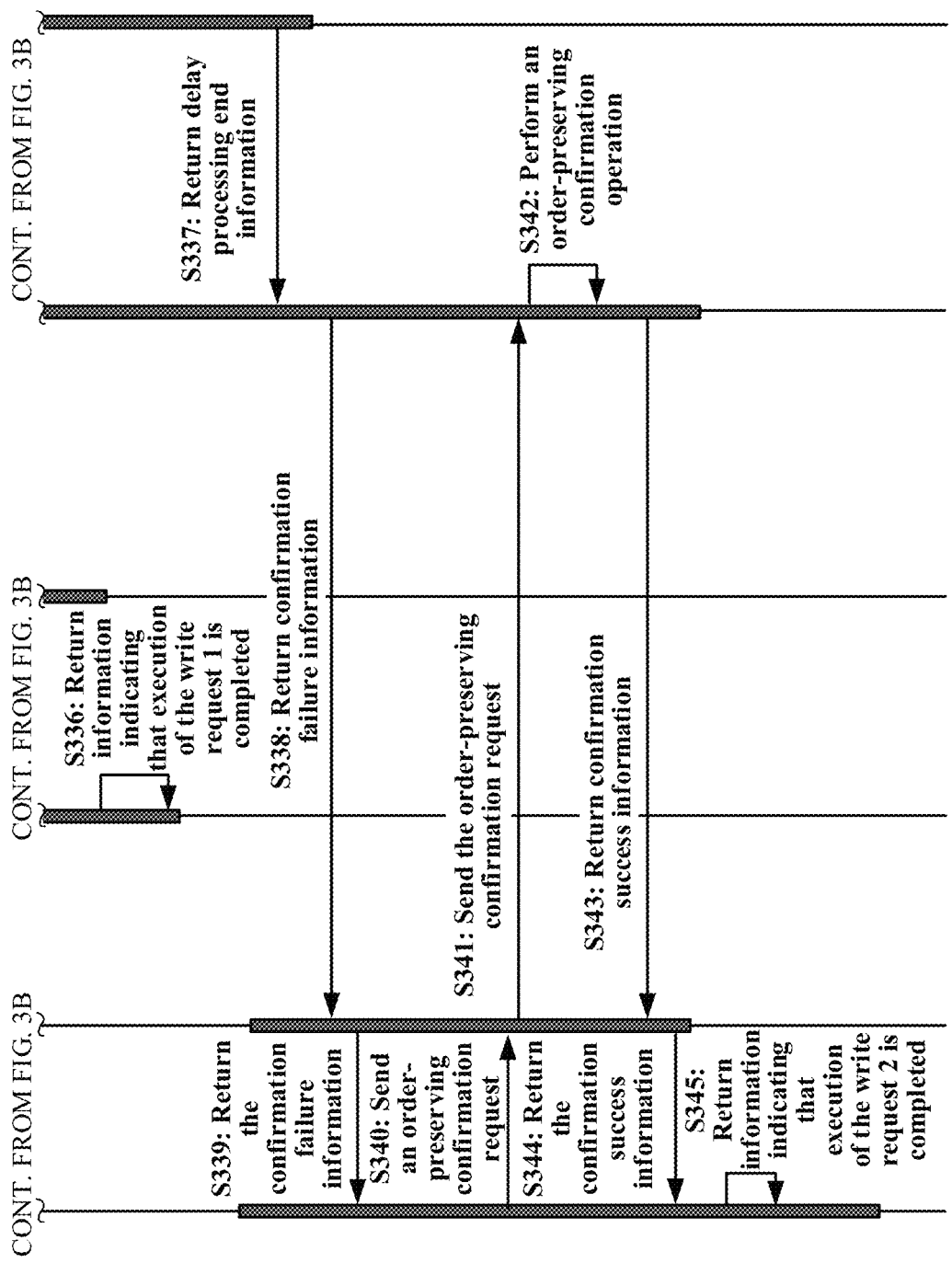

FIG. 3A, FIG. 3B, and FIG. 3C are a flowchart of a method for order-preserving execution of a write request according to an embodiment of this application. The method is jointly performed by a CPU1 and a NIC1 in a computing node C1, a CPU2 and an NIC2 in a computing node C2, and an NIC0 and a CPU0 in a storage node S0.

As shown in FIG. 3A, first, in step S301, the CPU1 of the computing node C1 receives a write request 1. The write request 1 is initiated by a user on an APP. For example, after applying for a PLOG1 through the APP, a user of the computing node C1 is intended to write data 1 in a cache of the APP into the PLOG1, to store the data 1 in a storage node. Therefore, the user initiates the write request 1 for the data 1 through the APP. The write request 1 includes, for example, the following information: PLOG1, len=10, and buf=0x100. PLOG1 in the write request indicates that the data 1 is to be written into the PLOG1. len=10 indicates that a length of the data 1 is 10 bytes. buf=0x100 indicates that the data 1 is currently stored in storage space that is in an MEM1 of the computing node C1, whose start address is an address of 100, and whose length is 10 bytes. After the user initiates the write request 1, the CPU1 of the computing node C1 receives the write request 1 through the APP.

In step S302, the CPU1 sends an address assignment request to the NIC1, to request the storage node S0 to assign a write address for the write request 1.

In the computing node C1, based on RDMA software and hardware architectures, a transport interface layer (software transport interface) is arranged between the application and the NIC1. The transport interface layer is usually referred to as a Verbs interface layer. Each interface in the interface layer may correspond to requesting an RDMA operation. For example, the interface layer may include a write interface, a read interface, an atomic fetch and add (FAA) interface, and an atomic compare and swap (CAS) interface. The write interface corresponds to requesting a remote NIC to perform a unilateral write operation. The read interface corresponds to requesting the remote NIC to perform a unilateral read operation. The FAA interface corresponds to requesting the remote NIC to perform a unilateral FAA operation. The CAS interface corresponds to requesting the remote NIC to perform a unilateral CAS operation. The FAA operation and CAS operation are both atomic operations performed on an atomic variable. The atomic variable is a basic unit of an atomic operation. The atomic variable can ensure that a series of atomic operations are not interrupted, to ensure security of the atomic operations. The atomic operations include a series of operations that are not interrupted by another operation. Once started, such operations are run until the end without being switched to another operation in the middle. Specific execution processes of the FAA operation and the CAS operation are described below in detail.

After receiving the write request 1, the CPU1 may call, for example, the FAA interface in the Verbs interface layer, to generate an address assignment request for requesting the remote NIC0 to perform the FAA operation, and send the address assignment request to the NIC1, to request the storage node S0 to assign, for the write request 1, an address that is in the PLOG1 and that is for writing the data 1. Specifically, the address assignment request includes the following information: PLOG1 and len=10. The pieces of information are used as incoming parameters of the FAA operation. The address assignment request further includes an identifier of the write request 1, to indicate that the address assignment request corresponds to the write request 1. In addition, the address assignment request further includes an identifier of the storage node S0, to indicate to send the address assignment request to the storage node S0.

It may be understood that the address assignment request sent by the CPU1 as described above is merely an example, and this embodiment of this application is not limited thereto. The address assignment request is not limited to requesting the storage node S0 to perform a unilateral FAA operation to assign an address. For example, the address assignment request may be for requesting the storage node S0 to perform a bilateral operation, to assign the write address for the write request 1 through the CPU0 in the storage node S0. The CPU0 may assign a write address by, for example, locking a variable, instead of necessarily assigning the write address by performing the FAA operation on the atomic variable.

Step S303: The NIC1 sends the address assignment request to the NIC0 of the storage node S0.

After receiving, from the CPU1, the address assignment request for requesting the remote NIC to perform the FAA operation, the NIC1 sends the address assignment request to the NIC0 of the storage node S0, for requesting the NIC0 of the storage node to assign the write address for the write request 1. Similarly, the address assignment request sent by the NIC1 includes PLOG1, len=10, and the identifier of the write request 1.

In step S304, the NIC0 assigns an address 1 for the write request 1.

After receiving, from the NIC1, the address assignment request for assigning the address for the write request 1, the NIC0 assigns, for the write request 1, address space 1 for storing to-be-written data in the write request 1. The address space 1 may also be referred to as the address 1. Generally, the address space is represented by a start address plus a length of the address space. A variable (for example, a variable a) may be set in the NIC0 to indicate a start address in unassigned address space in the PLOG1. Therefore, when the NIC0 assigns the address 1 for the write request 1, a value of the variable a (for example, an offset address 1) may be first obtained as the start address of the address 1 assigned for the write request 1. In this way, the address 1 assigned for the write request 1 is address space whose start address is the offset address 1 and whose length is a length of the to-be-written data in the write request 1. After assigning the address 1 for the write request 1, the NIC0 updates the value of the variable a to the offset address 1 plus the length of the to-be-written data.

Figure 4:
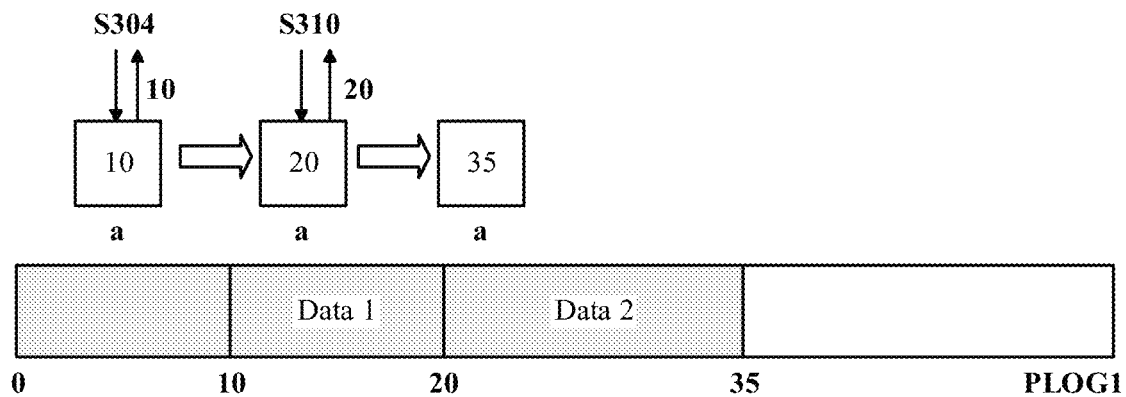
FIG. 4 is a schematic diagram of assigning an address for a write request according to an embodiment of this application.

In an implementation, the NIC0 assigns the write address for the write request 1 by performing the FAA operation. Specifically, after receiving, from the NIC1, the address assignment request for requesting to perform the FAA operation, the NIC0 performs the FAA operation, and sets incoming parameters of the operation to PLOG1 and len=10. Therefore, the following atomic operation is performed on the atomic variable a in the NIC0: reading a current value (the offset address 1) of the atomic variable a, adding 10 to the value of the atomic variable a, and returning a read value of the atomic variable. FIG. 4 is a schematic diagram of assigning an address for a write request according to an embodiment of this application. FIG. 4 shows variation of the value of the variable a in an address assignment process. FIG. 4 further shows a logical storage unit PLOG1. A number marked below PLOG1 is an offset address starting from 0. As shown in FIG. 4, for example, when step S304 is performed, the value of the atomic variable a is 10. Therefore, in the process of performing the FAA operation, first, the value of the atomic variable a is read as 10, so that 10 is a start address of the address 1 that is assigned by the NIC0 for the write request 1 for writing the data 1. Then, the value of the atomic variable a is changed to 10+10=20, and 10 is returned as the start address of the address 1 assigned for the write request 1. After the FAA atomic operation is performed, the value of the atomic variable a is changed to 10+10=20. To be specific, when the NIC0 performs the FAA operation next time to assign a write address to another write request, a start address of the assigned address is 20. The NIC0 may receive a plurality of address assignment requests from a plurality of clients substantially simultaneously. In this case, the NIC0 performs the FAA atomic operation on the atomic variable a based on a sequence of receiving the address assignment requests, to ensure that write addresses are assigned for write requests serially, thereby ensuring correctness of address assignment, and consecutively assigning space of the PLOG1 for the write requests.

It may be understood that, the NIC0 is not limited to assigning the write address for the write request by performing the FAA operation. For example, the NIC0 may lock the variable a by executing code and perform a series of operations on the variable, so that the write addresses may be assigned for the write requests mutually exclusively.

In step S305, the NIC0 returns the address 1 to the NIC1. Specifically, the NIC0 may return the offset address 1 together with the identifier of the write request 1 to the NIC1, to indicate that the offset address 1 is the start address of the write address assigned for the write request 1. In step S306, the NIC1 returns the address 1 to the CPU1. Similarly, the NIC1 may return the offset address 1 together with the identifier of the write request 1 to the CPU1. Therefore, through S302 to S306, the CPU1, the NIC1, and the NIC0 jointly perform a unilateral FAA operation, so that the CPU1 obtains the write address (in other words, the address 1) assigned for the write request 1.

In step S307, the CPU2 of the computing node C2 receives a write request 2 through an upper-layer application. The write request 2 includes, for example, the following information: PLOG1, len=15, and buf=0x200. Then, similar to steps S302 to S306, a unilateral FAA operation for assigning a write address for the write request 2 is performed once through steps S308 to S312 in FIG. 3A, so that the CPU2 obtains the address 2 in PLOG1 assigned for the write request 2. Specifically, the address 2 is address space whose start address is an offset address 2 and whose length is 15. It may be understood that, because the address 2 is assigned after the address 1 is assigned, apparently, an address in the address 2 is greater than an address in the address 1. For example, as shown in FIG. 4, after the FAA operation on the variable a in step S310 is performed, a current value of the variable a is 20. Therefore, after the FAA operation, 20 is returned. To be specific, the start address of the address 2 assigned for the write request 2 is 20. After the address 2 is assigned, the value of the variable a is changed to 20+15=35.

In step S313, the CPU1 of the computing node C1 sends a write operation request to the NIC1, to request the storage node S0 to write the data 1 into the address 1.

In an implementation, after receiving the address 1 returned from the NIC0, the CPU1 may call a write interface in the Verbs interface layer, to generate a write operation request for requesting the remote NIC0 to write the data 1 into the address 1, and send the write operation request to the NIC1. Specifically, the request includes the following information: S0, PLOG1, the offset address 1, len=10, buf=0x100, and the identifier of the write request 1. S0 is an identifier of the storage node S0, and indicates to send the write operation request to the storage node S0.

In step S314, the NIC1 of the computing node C1 reads data 1 from a memory.

Through the RDMA software and hardware architectures, the NIC1 may directly read data from the memory without using an operating system OS. Specifically, based on "len=10, buf=0x100" in the write operation request received from the CPU1, the NIC1 reads data of a length of 10 bytes starting from a memory address 100 as the data 1.

In step S315, the NIC1 sends the write operation request to the NIC0, for requesting the NIC0 to write the data 1 into the address 1 of the PLOG1. The write operation request sent by the NIC1 to the NIC0 includes the following information: PLOG1, the offset address 1, the data 1, and the identifier of the write request 1.

In step S316, the NIC0 writes the data 1 into the address 1 of the PLOG1 based on the write operation request received from the NIC1, that is, writes the data 1 into a physical address corresponding to the address 1.

As shown in FIG. 4, by performing this step, the data 1 is written starting from the offset address of 10 in the PLOG1, and a length of the data 1 is 10. When establishing the PLOG1, the storage node S0 records a start physical address corresponding to the PLOG1 into the NIC0. Therefore, through the RDMA software and hardware architectures, the NIC0 may directly write the data 1 into a physical address that is in storage space (for example, an SCM) of the storage node S0 and that corresponds to the address 1 in the PLOG1 without using the OS system and the CPU0.

In the foregoing case in which the storage nodes S0 to S2 store a plurality of copies of data, the NIC1 may perform step S315 on the NICs of both the storage nodes S1 and S2, to separately write the data 1 into physical addresses that are in the storage nodes S0 to S2 and that correspond to the address 1 in the PLOG1.

In step S317, the NIC0 returns confirmation information to the NIC1, to confirm that the data 1 is written into the address 1. The confirmation information includes, for example, the identifier of the write request 1. In step S318, the NIC1 returns the confirmation information to the CPU1.

Similarly, the confirmation information includes, for example, the identifier of the write request 1.

In steps S319 to S324, similar to steps S313 to S318, the CPU2 of the computing node C2 initiates a unilateral write operation on the storage node S0 by sending a write operation request to the NIC2, so that data 2 is written starting from the offset address 2 (20) in the PLOG1, and a length of the data 2 is 15. To be specific, the data 2 is written into a physical address that is in the storage node S0 and corresponds to the PLOG1 and the address 2. In other words, as described above, an address is assigned for a write request, and corresponding data is written into the address, so that the data 1 and the data 2 are consecutively stored. There is no unused free memory space (in other words, a hole) between the data 1 and the data 2, so that storage space of the memory is used more efficiently.

In step S325, the CPU2 in the computing node C2 sends an order-preserving confirmation request to the NIC2, to request the storage node S0 to confirm whether a write operation on the data 2 is an order-preserving write operation. In an implementation, the CPU2 generates, by calling the CAS interface, an order-preserving confirmation request for requesting the NIC0 of the storage node S0 to perform the CAS operation, and sends the order-preserving confirmation request to the NIC2. The request includes, for example, the following information: S0, the offset address 2, the offset address 2+len2, and an identifier of the write request 2, where len2 is a length of the data 2.

In step S326, the NIC2 sends the order-preserving confirmation request to the NIC0, to request the NIC0 of the storage node S0 to perform an order-preserving confirmation operation. The order-preserving confirmation request sent by the NIC2 to the NIC0 includes the following information: the offset address 2, the offset address 2+len2, and the identifier of the write request 2.

In step S327, the NIC0 performs an order-preserving confirmation operation to confirm whether a write operation corresponding to the write request 2 is an order-preserving write operation.

Figure 5:
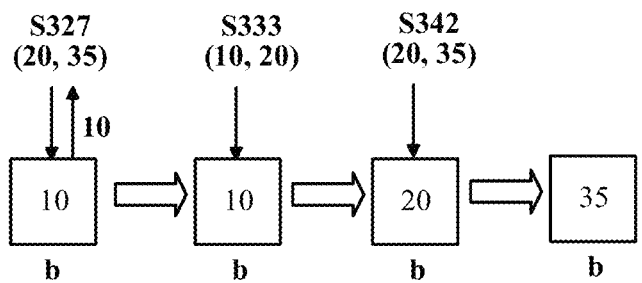
FIG. 5 is a schematic diagram of a process of performing a CAS operation on a variable b.

In an implementation, to enable the computing nodes to perform an order-preserving write operation on the PLOG1, the storage node S0 sets, for example, an atomic variable b in a memory. A value of the atomic variable b indicates a start address of address space corresponding to all write requests of which execution is not completed. An initial value of the atomic variable b is set to 0. Therefore, the CAS operation is performed on the atomic variable b to confirm whether the write operation corresponding to the write request is an order-preserving write operation. When step S327 is performed, the NIC0 performs the CAS operation by using (the offset address 2, the offset address 2+len2) as incoming parameters. The offset address 2 is a value for comparison with a value of the variable b. The offset address 2+len2 swaps an original value of the variable b when the comparison succeeds (in other words, the offset address 2=the value of the variable b), as described above, for example, the offset address 2=20, and len2=15, to be specific, the offset address 2+len2=35. FIG. 5 is a schematic diagram of a process of performing the CAS operation on the variable b. As shown in FIG. 5, in step S327, the NIC0 performs the following atomic operation on the atomic variable b: The value of the atomic variable b is read. For example, because the computing node C1 has not called the CAS interface corresponding to the write request 1 to perform the CAS operation on the variable b, currently, the value of the atomic variable is 10. The value of the variable b is compared with the incoming offset address 2=20. The value of the variable b is not equal to the incoming offset address herein. When the value of the variable b is not equal to the incoming offset address, the value (that is, 10) of the variable b is returned, which indicates that the current address comparison fails, to be specific, the current order-preserving confirmation fails. In other words, the current write operation of writing the data 2 into the address 2 is not an order-preserving write operation, and therefore, execution of the write request 2 cannot be currently completed.

It may be understood that the foregoing description of the order-preserving confirmation operation is merely an example, and this embodiment of this application is not limited thereto. For example, the NIC0 may implement a corresponding function by executing code by a microprocessor included in the NIC0. For example, the NIC0 may complete the order-preserving confirmation operation by locking a specific variable to perform a plurality of consecutive operations on the specific variable.

In step S328, the NIC0 of the storage node S0 determines whether to perform delay processing.

Figure 6:
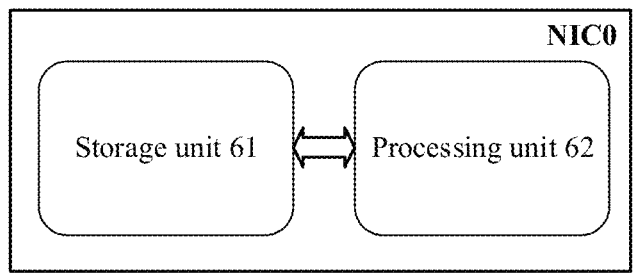
FIG. 6 is a schematic diagram of a structure of a NIC0 according to an embodiment of this application.

Currently, because a network interface card has a limited quantity of processing capabilities, the network interface card can perform a limited quantity of operations. As described above, in an RDMA software architecture, in correspondence with the foregoing Verbs interfaces, unilateral operations that can be performed by the network interface card include a write operation, a read operation, an FAA operation, a CAS operation, and the like. To increase operations that can be performed by the network interface card, software and/or hardware of the network interface card needs to be changed. FIG. 6 is a schematic diagram of a structure of a NIC0 according to an embodiment of this application. As shown in FIG. 6, the NIC0 includes a storage unit 61 and a processing unit 62. The processing unit 62 performs operations by executing executable code in the storage unit 61. In this case, to enable the NIC0 to perform step S328, determining logic code for performing step S328 may be set in the storage unit 61. When the NIC0 performs the CAS operation in step S327, but the address comparison fails, the NIC0 is triggered to execute the determining logic code in the storage unit 61. The determining logic code is executed, so that when it is determined to perform delay processing, the NIC0 is triggered to perform step S329 to send information to the CPU0, or when it is determined not to perform delay processing, the NIC0 is triggered to perform step S338 to send information to the NIC2.

Figure 7:
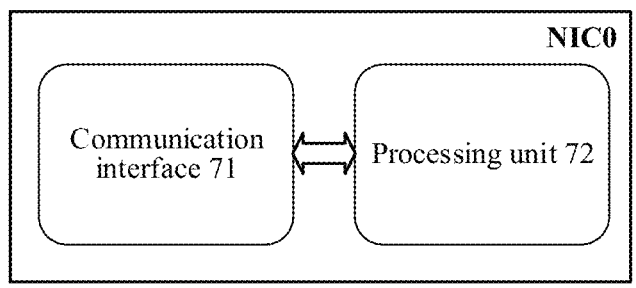
FIG. 7 is a schematic diagram of a structure of another NIC0 according to an embodiment of this application.

FIG. 7 is a schematic diagram of a structure of another NIC0 according to an embodiment of this application. As shown in FIG. 7, the NIC0 includes a communication interface 71 and a processing unit 72. The communication interface 71 performs data with, for example, a storage node and a computing node. The processing unit 72 processes, for example, through logic circuits arranged in the processing unit 72, data received by the communication interface 71. In this case, to enable the NIC0 to perform step S328, hardware configurations of the NIC0 may be changed, so that a determining logic circuit configured to perform step S328 is arranged in the processing unit 72. The determining logic circuit may be set to trigger, when it is determined to perform delay processing, to perform step S329 to send information to the CPU0; or trigger, when it is determined not perform delay processing, to perform step S338 to send feedback information to the NIC2.

In an implementation, the NIC0 may determine, according to a preset rule in the NIC0, whether to perform delay processing. The preset rule may be set by a manager of the storage node S0 through an upper-layer application, so that the preset rule is read through the determining logic code or by the determining logic circuit during running, or may be preset in the NIC0 by a programmer in a form of code, or may be preset in the NIC0 in a form of hardware when the NIC0 is produced. The preset rule is, for example, determining, based on a current service load and/or a current value of the variable b, whether to perform delay processing. For example, the NIC0 determines the current service load by reading a preset variable in the memory. The service load may be, for example, determined from a quantity of upper-layer application requests received from the computing nodes. Alternatively, the service load may be determined from current RDMA communication traffic of the storage nodes or RDMA communication traffic of the storage node S0. According to a determining rule, if the current service load is large, the NIC0 may determine to perform delay processing, to reduce occupation of the RDMA communication bandwidth, or if the current service load is small, the NIC0 may determine not to perform delay processing. According to another determining rule, if a difference between the offset address 2 and the current value of the variable b is greater than a predetermined value, it may be determined to perform delay processing. Alternatively, according to still another determining rule, it may be determined to perform delay processing only when both the service load and the value of the variable b meet preset conditions, and so on.

In another implementation, an artificial intelligence (AI) model used for determining whether to perform delay processing may be preset in the NIC0. The NIC0 may determine, through prediction performed by the AI model, whether to perform delay processing. For example, the AI model includes a pre-trained model formula. The NIC0 may obtain an input value (for example, the current service load and the value of the variable b) of the model, and input the current service load into the preset model formula, to determine, based on an output of the model, whether to perform delay processing.

It may be understood that, as shown by a dashed curved arrow of step S328 in FIG. 3B, this step is optional. When the address comparison in the foregoing CAS operation fails, the NIC0 may directly perform step S329 without performing the determining step.

In step S329, the NIC0 requests the CPU0 to perform delay processing.

In an implementation, the NIC0 sends a delay processing request to the CPU0. The request includes the identifier of the write request 2, to request the CPU0 to perform delay processing. In an implementation, the delay processing request includes calling a delay processing function. In an implementation, the delay processing request includes the offset address 2.

As described above, execution of step S329 may be triggered by performing step S328. In another case, when t the address comparison in the foregoing CAS operation fails, the NIC0 may also directly perform step S329. In the latter case, similar to the structures of the NIC0 shown in FIG. 6 and FIG. 7, software or hardware logic in the NIC0 may be changed, so that if the address comparison fails when the NIC0 performs the CAS operation in step S327, execution of step S329 is triggered, to enable the CPU0 to intervene in processing.

In step S330, the CPU0 performs delay processing.

The delay processing request includes calling the delay processing function or triggering the CPU0 to call the delay processing function. Therefore, after receiving the delay processing request from the NIC0, the CPU0 executes the delay processing function. In an implementation, the delay processing function is, for example, for timing predetermined duration, and returning timing end information after the timing ends, to achieve an effect of delay processing. In an implementation, after executing the delay processing function, the CPU0 obtains the current service load from a predetermined variable in the memory, determines a delay time based on the service load, times the determined delay time, and returns delay processing end information after the timing ends. In another implementation, the CPU0 obtains the offset address 2 from the delay processing request, determines a delay time based on the service load and/or a difference between the offset address 2 and the value of the variable b, times the determined time, and returns delay processing end information after the timing ends.

In step S331, similar to the foregoing step S325, the CPU1 of the computing node C1 sends an order-preserving confirmation request to the NIC1, to request the storage node S0 to confirm whether a write operation performed on the address 1 based on the write request 1 is an order-preserving write operation. Similarly, the CPU1 may send the order-preserving confirmation request to the NIC1 by calling the CAS interface. The order-preserving confirmation request includes S0, the offset address 1, the offset address 1+len1, and the identifier of the write request 1.

In step S332, the NIC1 sends the order-preserving confirmation request to the NIC0 of the storage node S0, to request the NIC0 to perform an order-preserving confirmation operation. The order-preserving confirmation request includes (the offset address 1, the offset address 1+len1) and the identifier of the write request 1. As described above, the offset address 1 is, for example, 10, and len1 is, for example, 10.

In step S333, the NIC0 performs an order-preserving confirmation operation.

Similar to the foregoing description, in this step, the NIC0 may perform the following CAS atomic operations on the variable b for order-preserving confirmation: reading the value of the variable b, comparing the value of the offset address 1 with the value of the variable b, and swapping the value of the variable b with the offset address 1+len1 if the value of the offset address 1 is equal to the value of the variable b; or returning the value of the variable b if the value of the offset address 1 is not equal to the value of the variable b. Still as shown in FIG. 5, when step S333 is performed, the value of the variable b is 10, and the address comparison succeeds. Therefore, in the CAS operation, the value of the variable b is changed to 10+10=20, and in the operation, the value of the variable b is not returned, indicating that the current order-preserving confirmation succeeds.

In step S334, the NIC0 returns confirmation success information to the NIC1. The information includes the identifier of the write request 1.

In step S335, the NIC1 returns the confirmation success information to the CPU1. The information includes the identifier of the write request 1.

In step S336, the CPU1 returns, to the application, information indicating that execution of the write request 1 is completed.

After receiving the confirmation success information for the write request 1, the CPU1 may determine that the write operation performed in the address 1 is an order-preserving write operation, and therefore, may determine that execution of the write request 1 is completed. Therefore, the CPU1 returns, to the application, the information indicating that the execution of the write request 1 is completed, to further feed back the information to the user through the application.

In step S337, the CPU0 returns delay processing end information to the NIC0.

After ending the timing based on the above processing of the delay processing function, the CPU0 returns the delay processing end information to the NIC0. The information includes the identifier of the write request 2, to enable the NIC0 to end delay processing on the write request 2.

In step S338, the NIC0 returns confirmation failure information to the NIC2. The information includes the identifier of the write request 2.

In step S339, the NIC2 returns the confirmation failure information to the CPU2. The information includes the identifier of the write request 2.

In step S340, the CPU2 sends an order-preserving confirmation request to the NIC2 again, to re-confirm whether the write operation performed in the address 2 is an order-preserving write operation. The CPU2 may send, to the NIC2 by calling the CAS interface, the order-preserving confirmation request for enabling the NIC0 to perform the CAS operation. The same as the order-preserving confirmation request sent last time, the order-preserving confirmation request includes S0, the offset address 2, the offset address 2+len2, and the identifier of the write request 2.

In step S341, the NIC2 sends the order-preserving confirmation request to the NIC0. The order-preserving confirmation request includes (the offset address 2, the offset address 2+len2) and the identifier of the write request 2.

In step S342, the NIC0 performs an order-preserving confirmation operation.

Similar to the foregoing description, the NIC0 may perform the order-preserving confirmation by performing the CAS operation. Specifically, the NIC0 performs the following atomic operation on the variable b: reading a value of the variable b, and determining whether the value of the variable b is equal to the offset address 2; and swapping the value of the variable b with the offset address 2+len2 if the value of the variable b is equal to the offset address 2; or returning the value of the variable b if the value of the variable b is not equal to the offset address 2.

As described above, the value of the variable b has been changed to 20 through the CAS operation performed by the NIC0 last time. Therefore, still as shown in FIG. 5, when step S342 is performed, upon comparison, the value of the variable b is equal to the offset address 2. Therefore, the value of the variable b is changed to 35 through the CAS operation. In other words, the current order-preserving confirmation succeeds.

In step S343, the NIC0 returns confirmation success information to the NIC2. The information includes the identifier of the write request 2.

In step S344, the NIC2 returns the confirmation success information to the CPU2. Similarly, the information includes the identifier of the write request 2.

In step S345, the CPU2 returns, to the application, information indicating that the execution of the write request 2 is completed.

After receiving the confirmation success information of the write request 2, the CPU2 may determine that a write operation performed in the address 2 based on the write request 2 is an order-preserving writing operation, and therefore, may determine that execution of the write request 2 is completed, to return completion information to the application, and feedback the completion information to the user through the application.

It may be learned from the foregoing process that, when the NIC0 determines that a write operation performed on data is not an order-preserving write, if it is determined that delay processing is required, an original unilateral order-preserving confirmation operation is converted into a bilateral operation, to enable the CPU0 to intervene in processing. A complex delay processing process is performed through the CPU0, and after delay processing performed by the CPU0 ends, confirmation failure information is returned to the NIC2, to reduce occupation of the RDMA communication bandwidth and improve communication efficiency of the storage system.

Figure 8A:
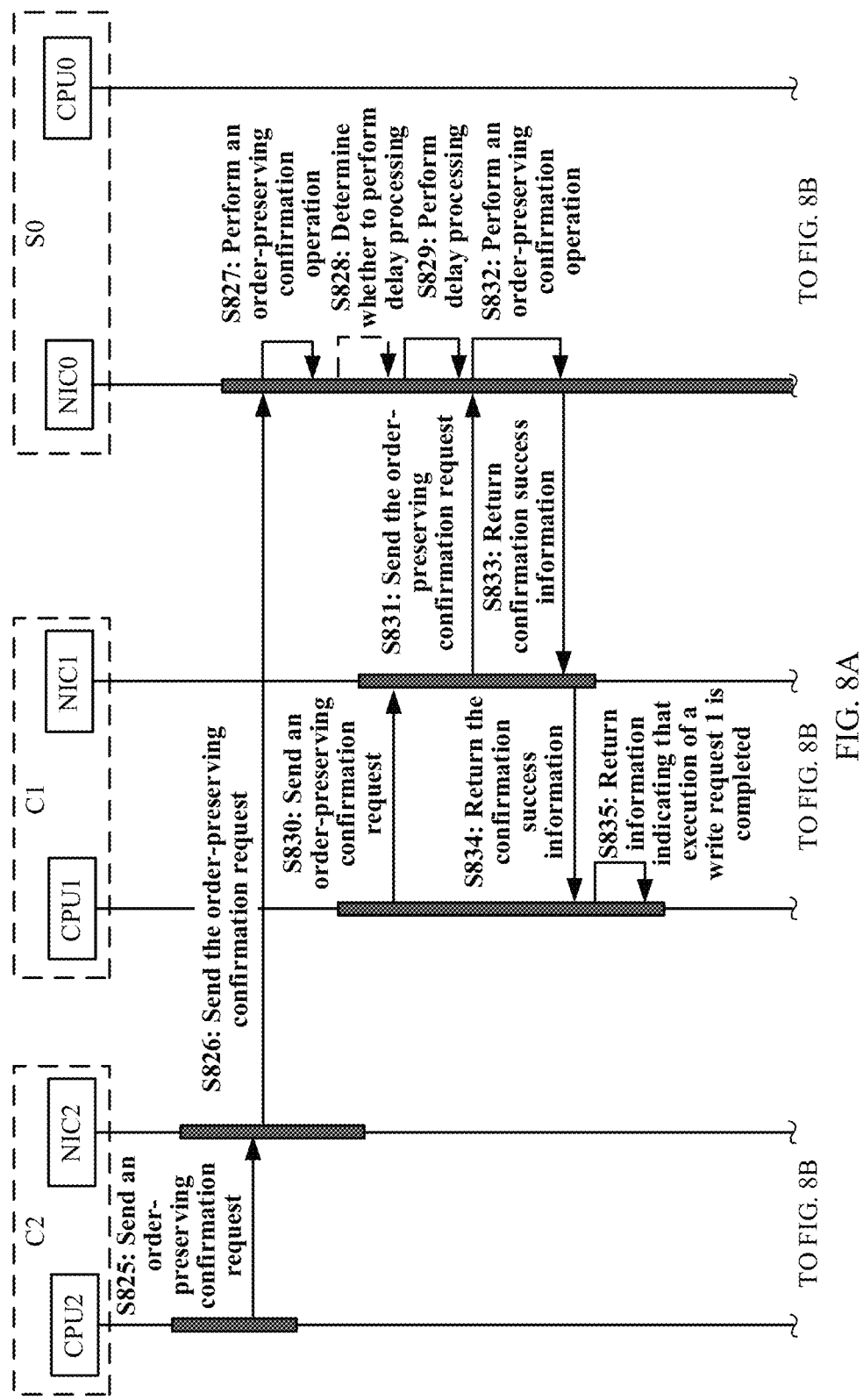
FIG. 8A and FIG. 8B are a flowchart of another method for order-preserving execution of a write request according to another embodiment of this application.
Figure 8B:
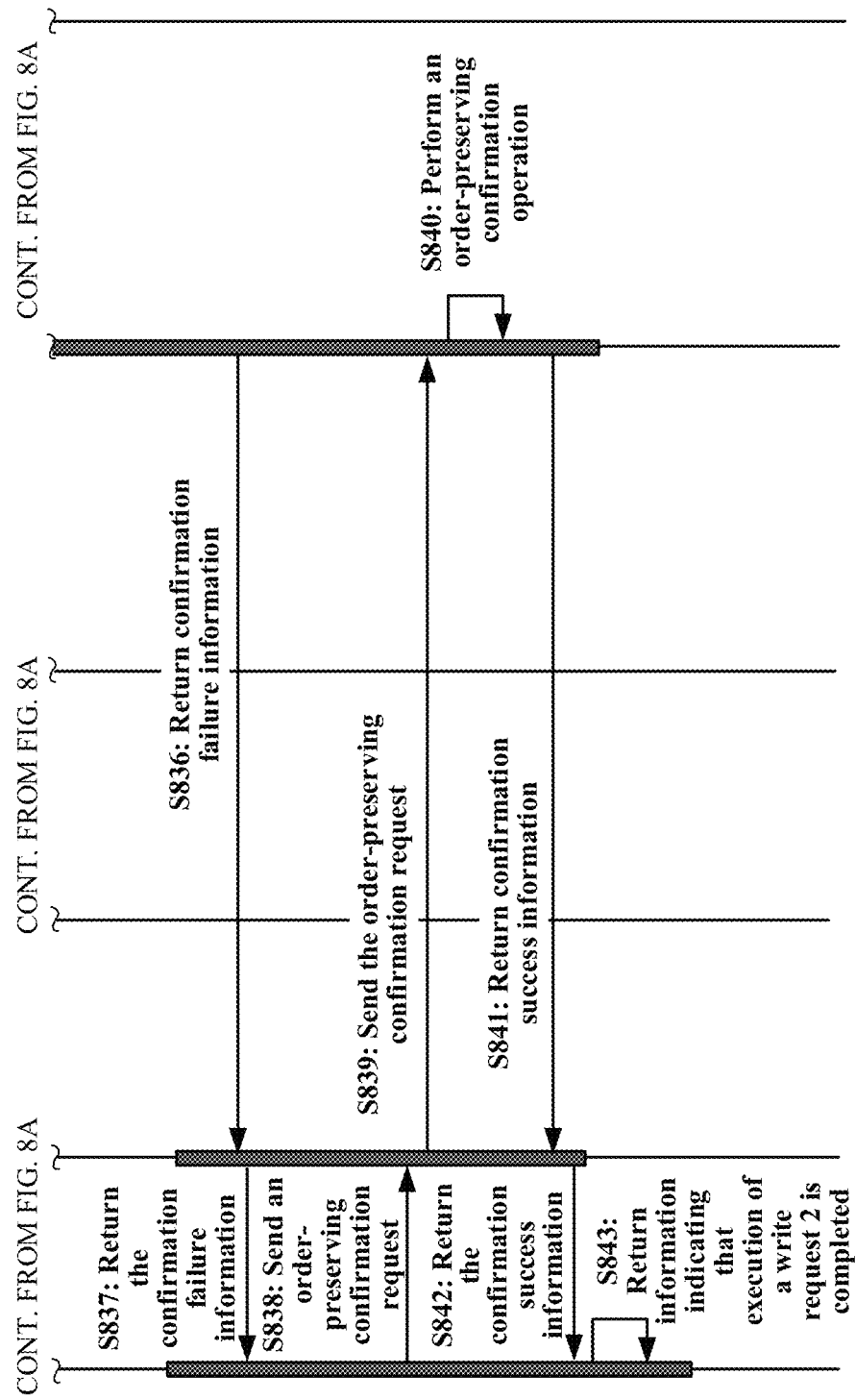

The write order-preserving solution in this embodiment of this specification is not limited to the foregoing description. FIG. 8A and FIG. 8B are a flowchart of another method for order-preserving execution of a write request according to another embodiment of this application.

Steps before step S829 in the method shown in FIG. 8A and FIG. 8B are the same as steps in the method shown in FIG. 3A, FIG. 3B, and FIG. 3C. Therefore, steps before step S825 are omitted from FIG. 8A and FIG. 8B. The flowchart shown in FIG. 8A and FIG. 8B differs from the flowchart shown in FIG. 3A, FIG. 3B, and FIG. 3C in that in step S829, when the NIC0 determines that delay processing is required, or when the NIC0 directly confirms a failure in an order-preserving confirmation operation, the NIC0 performs delay processing. Code or hardware logic for delay processing is preset in the NIC0, so that execution of the code or hardware logic for delay processing may be triggered based on a processing result of step S827 or step S828, to achieve the effect of delay processing achieved through the CPU0. Specifically, in an implementation, when step S829 is performed, the NIC0 may time predetermined duration by executing the code or hardware logic, and after the timing ends, trigger execution of step S836 to return confirmation failure information, to achieve the effect of delaying processing. In an implementation, the NIC0 may obtain a current service load from a predetermined variable in the memory, determine a delay time based on the service load, time the determined delay time, and trigger execution of step S836 after the timing ends. In another implementation, the NIC0 may determine a delay time based on a service load and/or a difference between the offset address 2 and the value of the variable b, time the determined time, and trigger execution of step S836 after the timing ends. Other steps in FIG. 8A and FIG. 8B are performed in the same manner as corresponding steps in FIG. 3A, FIG. 3B, and FIG. 3C, and details are not described herein again.

In the process shown in FIG. 8A and FIG. 8B, by executing the delay processing logic in the NIC0, occupation of the RDMA communication bandwidth is reduced, and communication efficiency of the storage system is improved. In addition, when the NIC0 determines that a write operation on data is not an order-preserving writing, if it is determined that delay processing is required, delay processing may be performed by using the software or hardware logic preset in the NIC0 without intervention of the CPU0, so that the order-preserving confirmation process is still a unilateral operation, thereby reducing occupation of the CPU0.

In this embodiment of this application, through operations performed by the network device in the storage node, when confirmation of an order-preserving confirmation request fails, sending feedback information to the computing node is delayed, to reduce occupation of the RDMA communication bandwidth and improve communication efficiency of the storage system.

Figure 9:
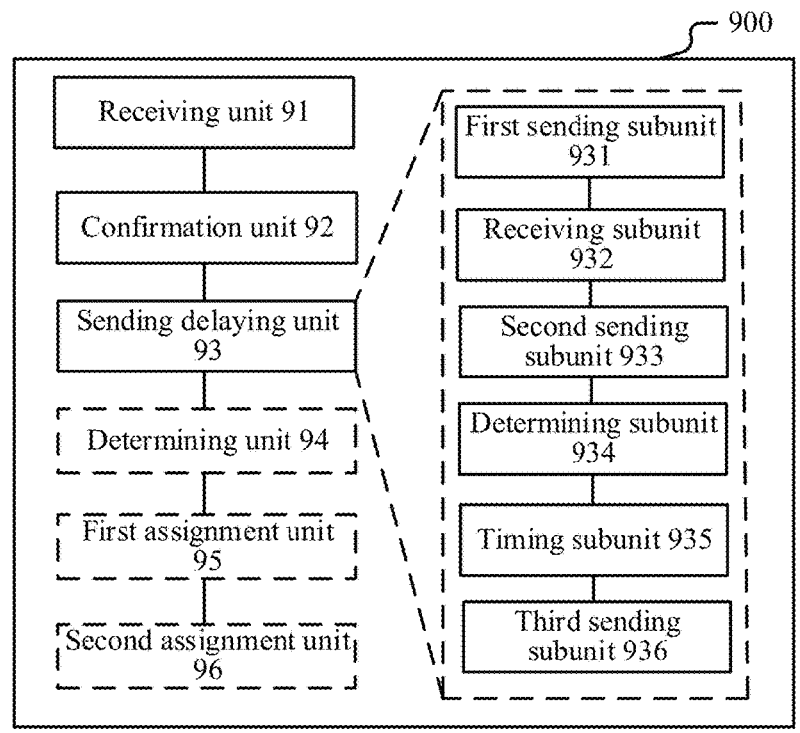
FIG. 9 is a schematic diagram of an apparatus for order-preserving execution of a write request according to an embodiment of this application.

FIG. 9 is a schematic diagram of an apparatus 900 for order-preserving execution of a write request according to an embodiment of this application. The apparatus 900 is deployed for execution in a network device of a storage node. The apparatus 900 includes:

a receiving unit 91 is configured to receive an order-preserving confirmation request, where the order-preserving confirmation request carries a first write address assigned for a first write request;

a confirmation unit 92, configured to confirm that execution of a second write request for which a second write address has been assigned is not completed, where the second write address precedes the first write address; and a sending delaying unit 93, configured to delay sending feedback information for the order-preserving confirmation request.

In an implementation, the sending delaying unit 93 includes: a first sending subunit 931, configured to send a delay processing request corresponding to the first write request to a processor of the storage node; a receiving subunit 932, configured to receive, from the processor after first duration timed by the processor, delay processing end information corresponding to the first write request; and a second sending subunit 933, configured to send the feedback information for the order-preserving confirmation request in response to the delay processing end information.

In an implementation, the sending delaying unit 93 includes: a determining subunit 934, configured to determine first duration; a timing subunit 935, configured to time the first duration; and a third sending subunit 936, configured to send the feedback information for the order-preserving confirmation request after the first duration elapses.

In an implementation, the apparatus 900 further includes: a determining unit 94, configured to determine, after it is confirmed that execution of the second write request for which the second write address has been assigned is not completed, whether a predetermined condition for delaying sending the feedback information is satisfied. The sending delaying unit 93 is further configured to delay sending the feedback information for the order-preserving confirmation request when it is determined that the predetermined condition is satisfied.

In an implementation, logical storage space corresponding to a segment of physical storage space in the storage node is set in the storage node. The apparatus 900 further includes: a first assignment unit 95, configured to assign, in the logical storage space, the second write address for the second write request before the order-preserving confirmation request is received; and a second assignment unit 96, configured to assign, in the logical storage space, the first write address for the first write request.

In an implementation, the confirmation unit 92 is configured to: determine whether a start address of the first write address is consistent with a start address of a write address corresponding to all current uncompleted write requests for the logical storage space, and determine, if the start address of the first write address is inconsistent with the start address of the write address corresponding to all the current uncompleted write requests for the logical storage space, that execution of the second write request is not completed.

Figure 10:
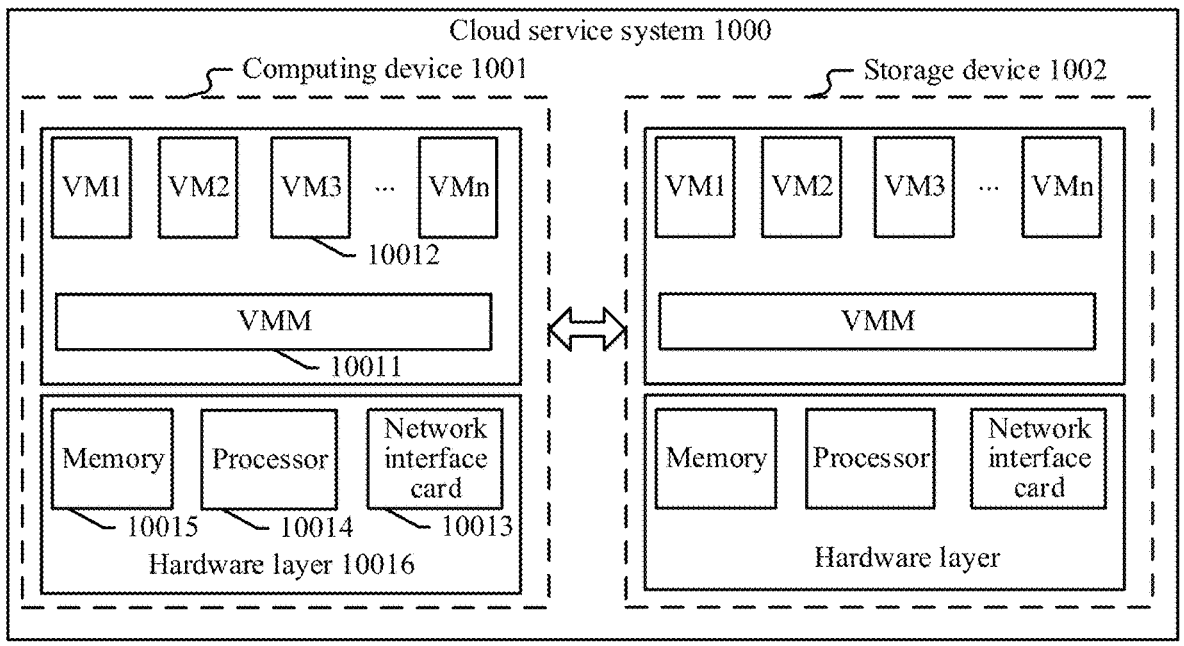
FIG. 10 is a schematic diagram of a cloud service system according to an embodiment of this application.

It may be understood that the computing nodes and the storage nodes described above may be physical servers, or may be cloud servers (for example, virtual servers). FIG. 10 is a schematic diagram of a cloud service system 1000 according to an embodiment of this application. Referring to FIG. 10, the system 1000 includes a computing device 1001 and a storage device 1002. The computing device 1001 includes a hardware layer 10016, a virtual machine monitor (VMM) 10011 run on the hardware layer 10016, and a plurality of virtual machines (VM$_i$) 10012. Any one of the virtual machines 10012 may be used as a virtual computing node of the cloud service system 1000. Similar to the computing device 1001, the storage device 1002 includes a hardware layer, a virtual machine monitor (VMM) run on the hardware layer, and a plurality of virtual machines (VM$_j$). Any one of the virtual machines may be used as a virtual storage node of the cloud service system 1000. The following describes composition of the computing device 1001 in detail as an example.

Specifically, the virtual machine 10012 is a virtual computer (server) simulated on a public hardware resource through virtual machine software. An operating system and an application may be installed on the virtual machine. The virtual machine may access a network resource. For an application run in a virtual machine, the virtual machine works like a real computer.

The hardware layer 10016 is a hardware platform for virtual environment running, and may be abstracted from hardware resources of one or more physical hosts. The hardware layer may include a plurality of types of hardware. For example, the hardware layer 10016 includes a processor 10014 (for example, a CPU) and a memory 10015, and may further include a network interface card (to be specific, a NIC) 10013, a high-speed/low-speed input/output (I/O) device, and another device with a specific processing function. The memory 10015 may be a volatile memory such as a random-access memory (RAM) and a dynamic random-access memory (DRAM). The memory 10015 also may be a non-volatile memory such as a read-only memory (ROM), a flash memory, a hard disk drive (HDD), or a solid-state drive (SSD), and a storage class memory (SCM). The memory 10015 also may include a combination of the foregoing types of memories. The virtual machine 10012 runs an executable program based on the VMM 10011 and a hardware resource provided by the hardware layer 10016, to implement the method steps performed by the computing node in the foregoing embodiments. For brevity, details are not described herein again.

It should be understood that terms such as "first" and "second" in this specification is used to achieve simplicity in distinguishing similar concepts, and do not constitute any limitation.

A person of ordinary skill in the art should be aware that units and algorithm steps in the examples described with reference to embodiments disclosed in this specification can be implemented by electronic hardware, computer software, or a combination of computer software and electronic hardware. To clearly illustrate interchangeability of hardware and software, various illustrative components and steps have been described above generally in terms of functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely examples of embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for order-preserving execution of a write request, wherein the method is performed by a network device of a storage node, logical storage space corresponding to a segment of physical storage space in the storage node is set in the storage node, and the method comprises:
   receiving an order-preserving confirmation request, wherein the order-preserving confirmation request carries a first write address assigned for a first write request;
   confirming that execution of a second write request for which a second write address has been assigned is not completed, wherein the second write address precedes the first write address, and confirming that the execution of the second write request for which the second write address has been assigned is not completed comprises:
      determining that the first write address is not a minimum write address in recorded write addresses comprised in uncompleted write requests accessing the logical storage space; and
      in response to determining that the first write address is not the minimum write address in the recorded write address comprised in the uncompleted write requests accessing the logical storage space, determining that the execution of the second write request is not completed; and
   delaying sending feedback information for the order-preserving confirmation request.

2. The method according to claim 1, wherein the delaying sending feedback information for the order-preserving confirmation request comprises:
   sending a delay processing request corresponding to the first write request to a processor of the storage node;
   receiving, from the processor after first duration timed by the processor, delay processing end information corresponding to the first write request; and
   sending the feedback information for the order-preserving confirmation request in response to the delay processing end information.

3. The method according to claim 1, wherein the delaying sending feedback information for the order-preserving confirmation request comprises:
   determining first duration;
   timing the first duration; and
   sending the feedback information for the order-preserving confirmation request after the first duration elapses.

4. The method according to claim 1, further comprising:
   after the confirming that execution of a second write request for which a second write address has been assigned is not completed, determining that a predetermined condition for delaying sending the feedback information is satisfied, wherein the delaying sending the feedback information for the order-preserving confirmation request comprises:
      delaying sending the feedback information for the order-preserving confirmation request in response to determining that the predetermined condition is satisfied.

5. The method according to claim 1, wherein before the receiving an order-preserving confirmation request, the method further comprises:
   assigning, in the logical storage space, the second write address for the second write request; and assigning, in the logical storage space, the first write address for the first write request.

6. A network device of a storage node, wherein logical storage space corresponding to a segment of physical storage space in the storage node is set in the storage node, and the network device comprises:
- at least one processor; and
- one or more memories coupled to the at least one processor and storing programming instructions for execution by the at least one processor to cause the network device to perform operations comprising:
  - receiving an order-preserving confirmation request, wherein the order-preserving confirmation request carries a first write address assigned for a first write request;
  - confirming that execution of a second write request for which a second write address has been assigned is not completed, wherein the second write address precedes the first write address, and confirming that the execution of the second write request for which the second write address has been assigned is not completed comprises:
    - determining that the first write address is not a minimum write address in recorded write addresses comprised in uncompleted write requests accessing the logical storage space; and
    - in response to determining that the first write address is not the minimum write address in the recorded write address comprised in uncompleted write requests accessing the logical storage space, determining that the execution of the second write request is not completed; and
  - delaying sending feedback information for the order-preserving confirmation request.

7. The network device according to claim 6, wherein the delaying sending feedback information for the order-preserving confirmation request comprises:
- sending a delay processing request corresponding to the first write request to a processor of the storage node;
- receiving, from the processor after first duration timed by the processor, delay processing end information corresponding to the first write request; and
- sending the feedback information for the order-preserving confirmation request in response to the delay processing end information.

8. The network device according to claim 6, wherein the delaying sending feedback information for the order-preserving confirmation request comprises:
- determining first duration;
- timing the first duration; and
- sending the feedback information for the order-preserving confirmation request after the first duration elapses.

9. The network device according to claim 6, wherein the operations further comprise:
- after confirming that the execution of the second write request for which the second write address has been assigned is not completed, determining that a predetermined condition for delaying sending the feedback information is satisfied, wherein the delaying sending the feedback information for the order-preserving confirmation request comprises:
  - delaying sending the feedback information for the order-preserving confirmation request in response to determining that the predetermined condition is satisfied.

10. The network device according to claim 6, wherein before the receiving an order-preserving confirmation request, the operations further comprise:
- assigning, in the logical storage space, the second write address for the second write request; and
- assigning, in the logical storage space, the first write address for the first write request.

11. A network device, comprising:
- a communication interface configured to perform data transmission with a storage node and a computing node, wherein logical storage space corresponding to a segment of physical storage space in the storage node is set in the storage node; and
- a processing unit configured to process data received by the communication interface to cause the network device to perform operations comprising:
  - receiving an order-preserving confirmation request, wherein the order-preserving confirmation request carries a first write address assigned for a first write request;
  - confirming that execution of a second write request for which a second write address has been assigned is not completed, wherein the second write address precedes the first write address, and confirming that the execution of the second write request for which the second write address has been assigned is not completed comprises:
    - determining that the first write address is not a minimum write address in recorded write addresses comprised in uncompleted write requests accessing the logical storage space; and
    - in response to determining that the first write address is not the minimum write address in the recorded write address comprised in the uncompleted write requests accessing the logical storage space, determining that the execution of the second write request is not completed; and
  - delaying sending feedback information for the order-preserving confirmation request.

12. The network device according to claim 11, wherein the delaying sending feedback information for the order-preserving confirmation request comprises:
- sending a delay processing request corresponding to the first write request to a processor of the storage node;
- receiving, from the processor after first duration timed by the processor, delay processing end information corresponding to the first write request; and
- sending the feedback information for the order-preserving confirmation request in response to the delay processing end information.

13. The network device according to claim 11, wherein the delaying sending feedback information for the order-preserving confirmation request comprises:
- determining first duration;
- timing the first duration; and
- sending the feedback information for the order-preserving confirmation request after the first duration elapses.

14. The network device according to claim 11, wherein the operations further comprise:
- after confirming that the execution of the second write request for which the second write address has been assigned is not completed, determining that a predetermined condition for delaying sending the feedback information is satisfied, wherein the delaying sending the feedback information for the order-preserving confirmation request comprises:

delaying sending the feedback information for the order-preserving confirmation request in response to determining that the predetermined condition is satisfied.

15. The network device according to claim 11, wherein before the receiving an order-preserving confirmation request, the operations further comprise:
assigning, in the logical storage space, the second write address for the second write request; and
assigning, in the logical storage space, the first write address for the first write request.

* * * * *